Nov. 2, 1954 K. CLARK 2,693,031
COMPUTING SIGHT
Filed May 9, 1945 12 Sheets-Sheet 1

INVENTOR.
BY Kendall Clark
J. Ralph Fiehr

Nov. 2, 1954
K. CLARK
2,693,031
COMPUTING SIGHT
Filed May 9, 1945
12 Sheets—Sheet 2
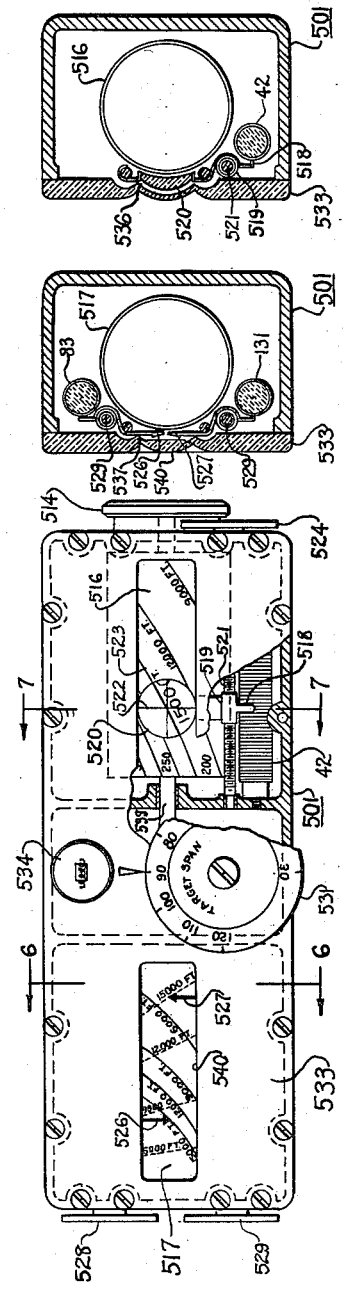
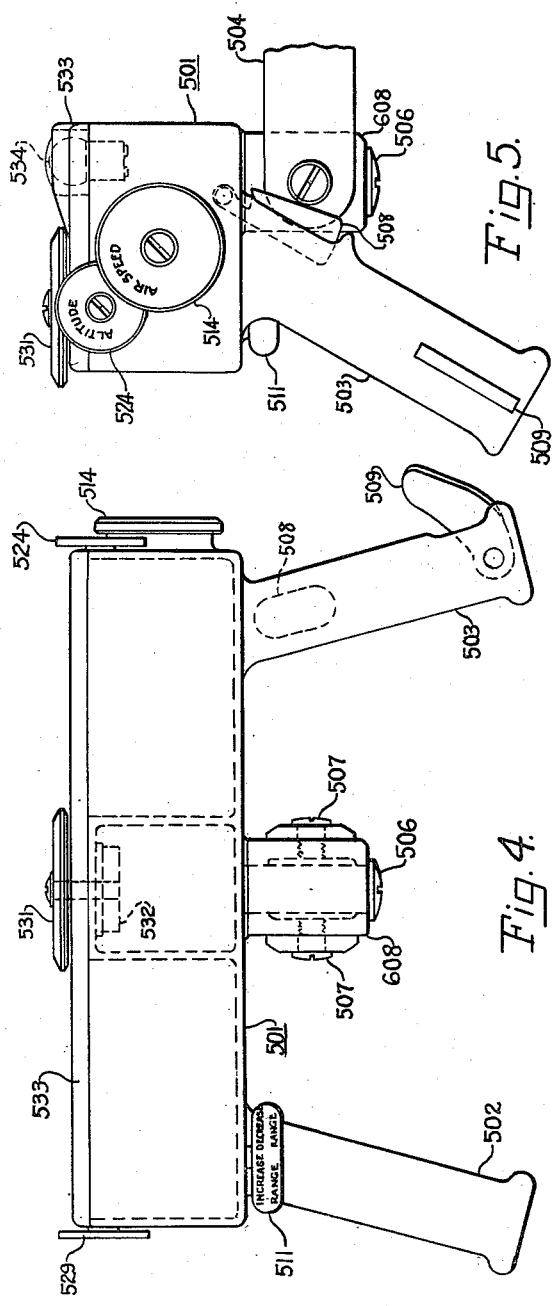
INVENTOR.
Kendall Clark
BY
J. Ralph Fehr Nov. 2, 1954          K. CLARK          2,693,031
COMPUTING SIGHT
Filed May 9, 1945          12 Sheets-Sheet 4

INVENTOR.
Kendall Clark
BY
J. Ralph Trahn

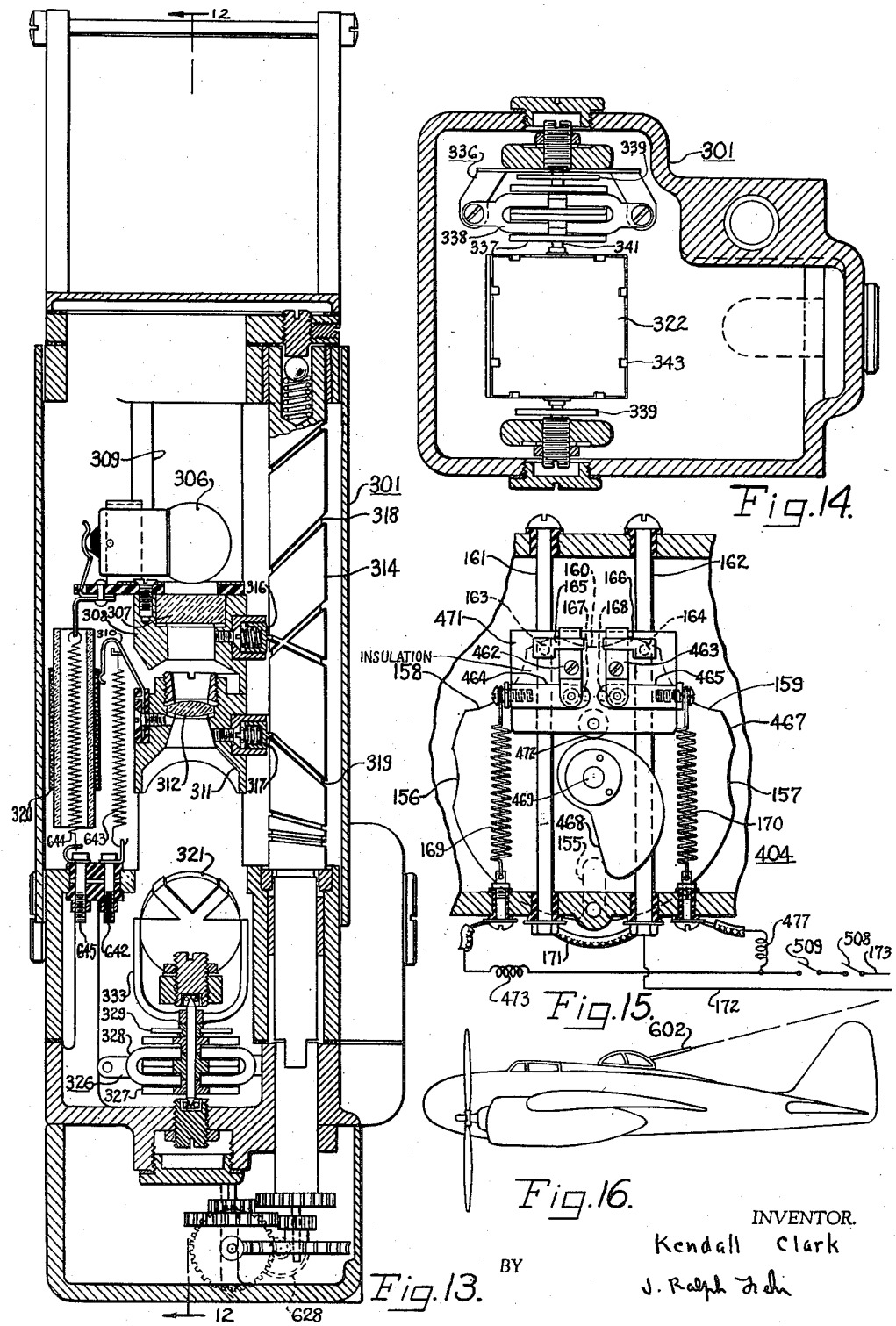

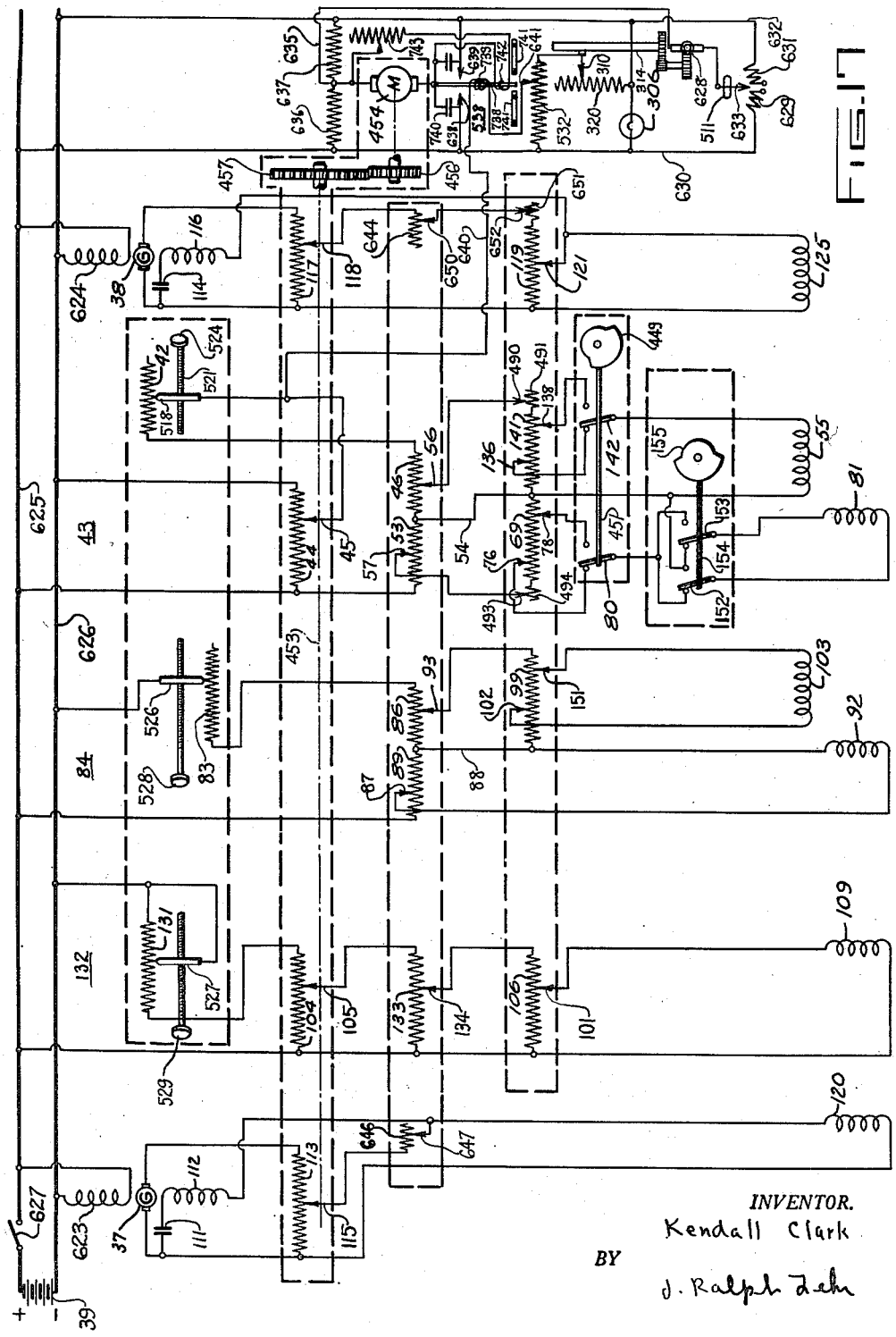

Nov. 2, 1954 K. CLARK 2,693,031
COMPUTING SIGHT
Filed May 9, 1945 12 Sheets-Sheet 8
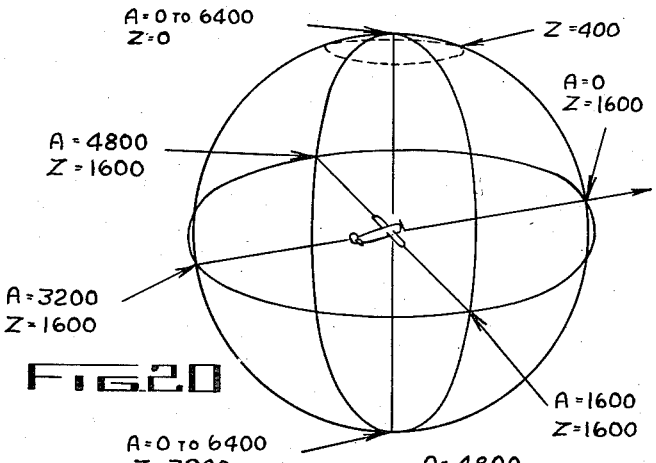
Fig.20
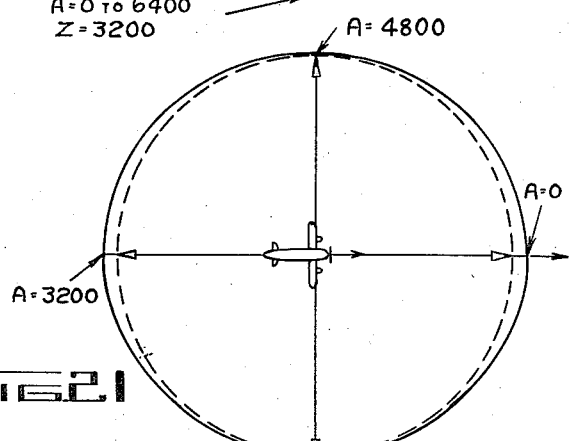
Fig.21
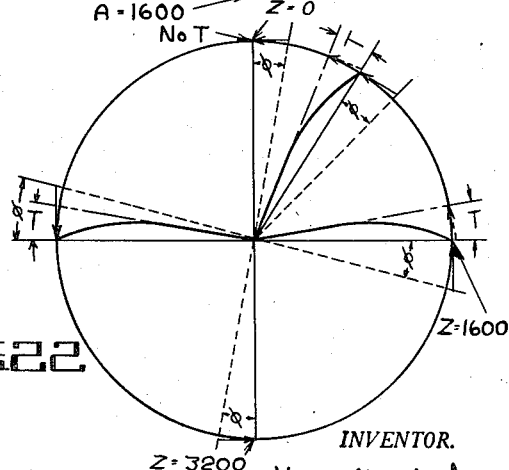
Fig.22
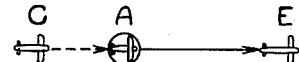
Fig.18
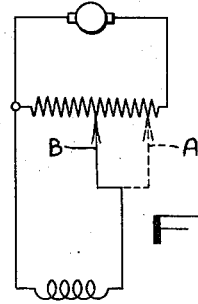
Fig.19
INVENTOR.
Kendall Clark
BY
J. Ralph Fehr

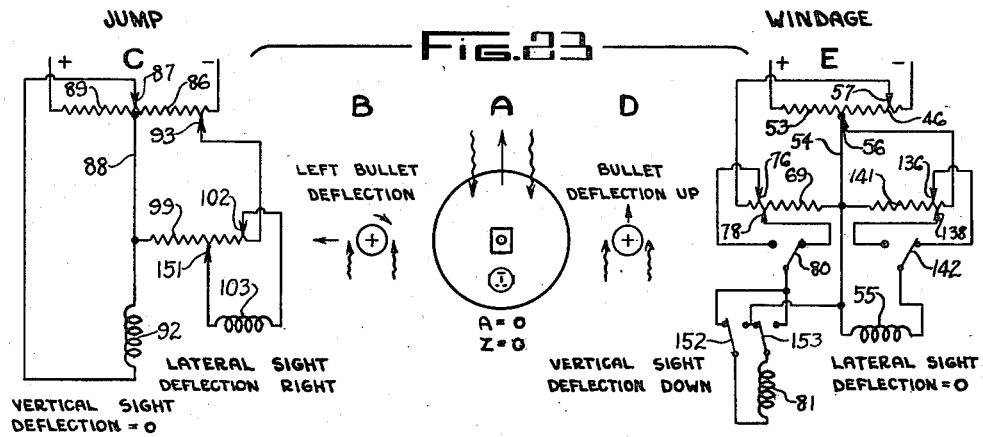
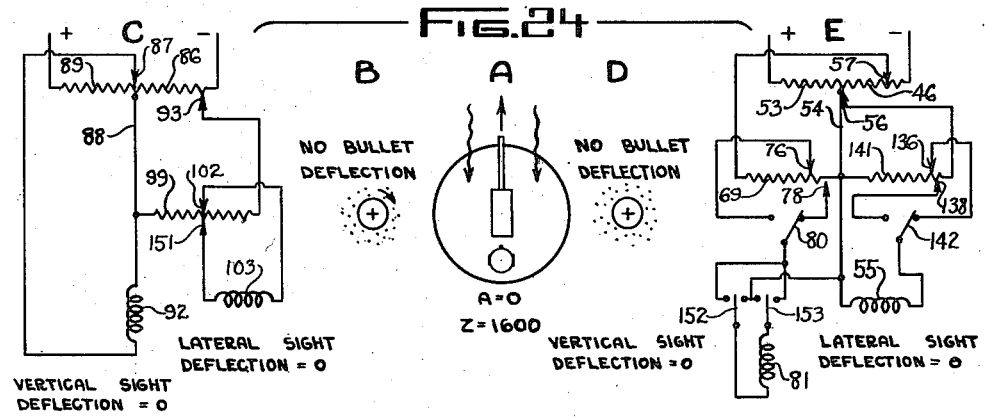
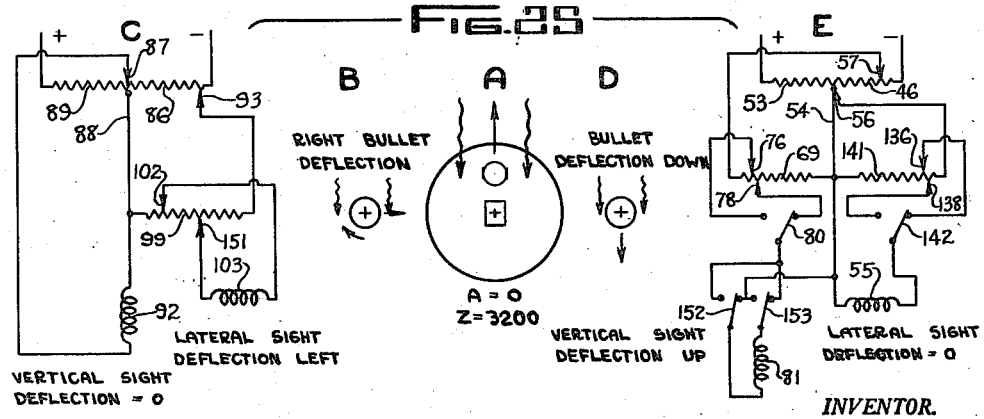

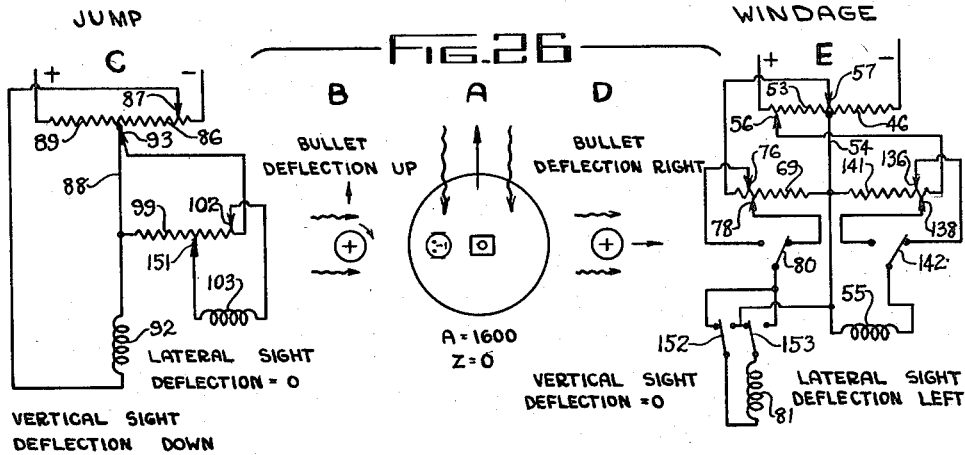
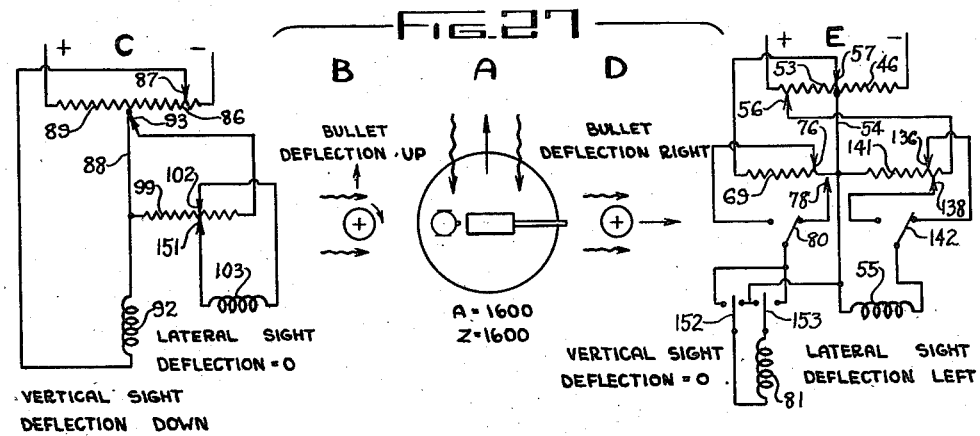
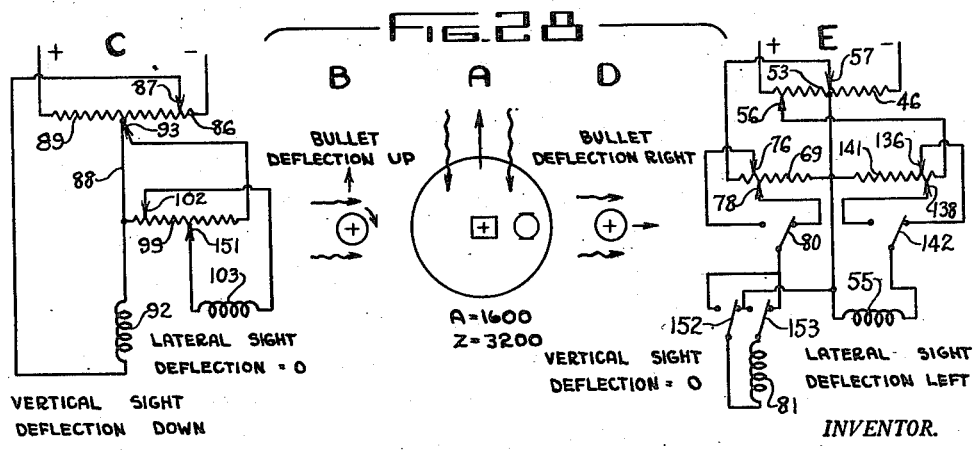

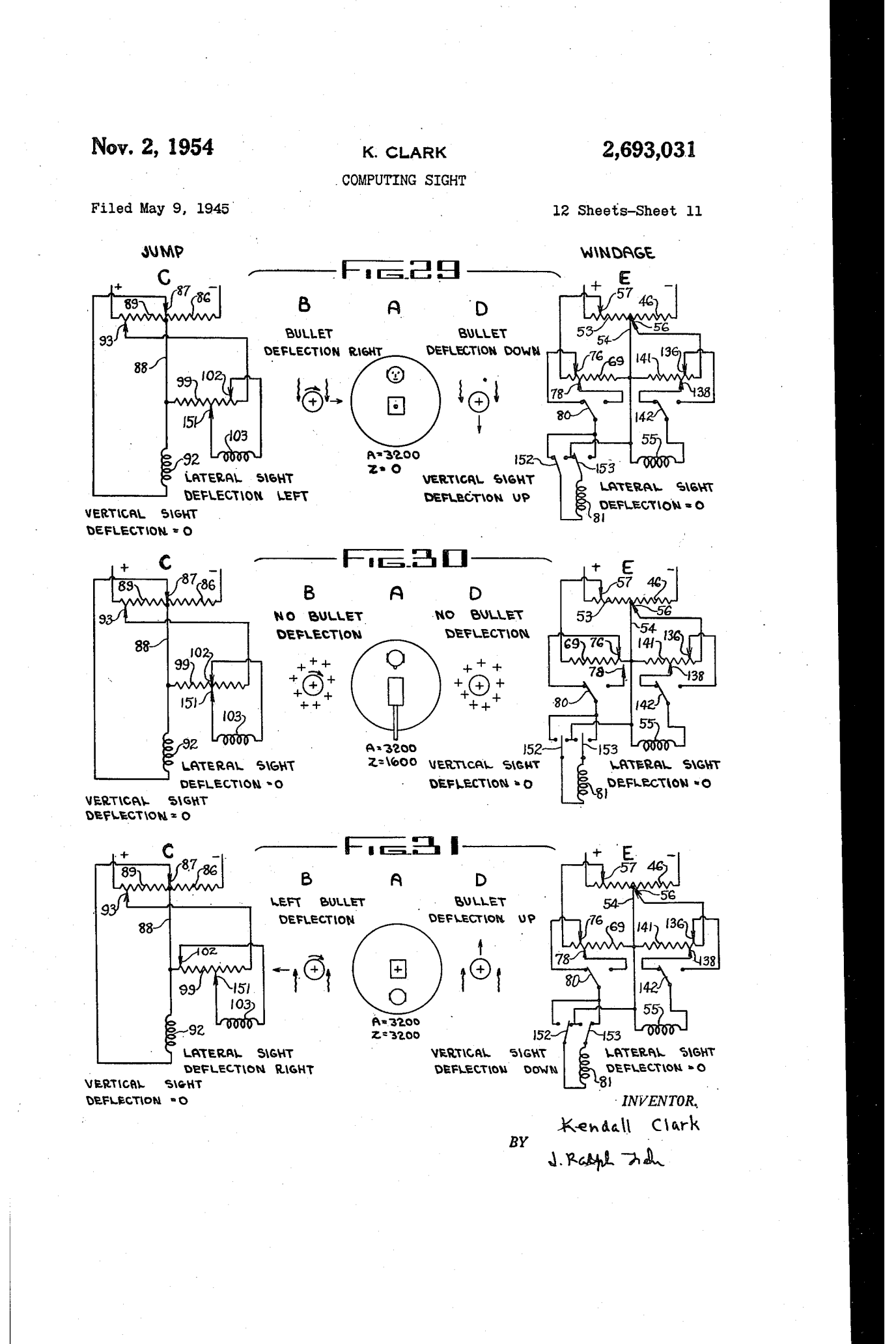

Nov. 2, 1954                    K. CLARK                    2,693,031
                             COMPUTING SIGHT
Filed May 9, 1945                                      12 Sheets-Sheet 11

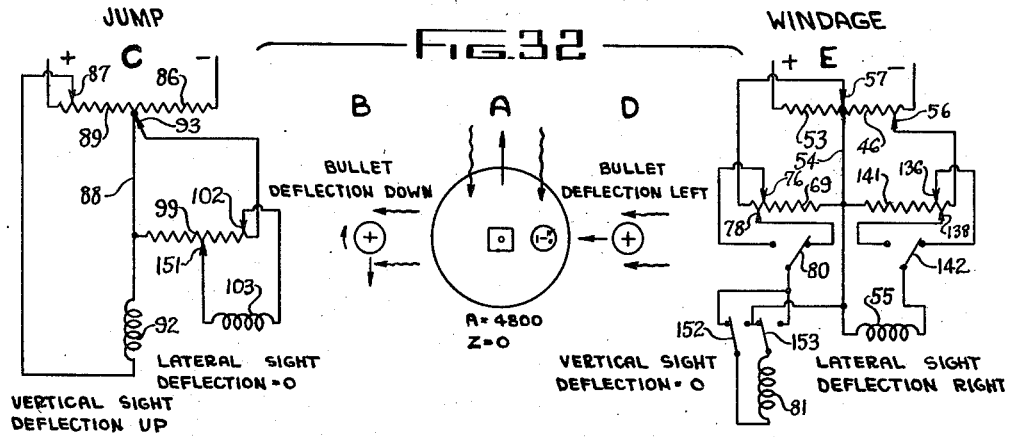
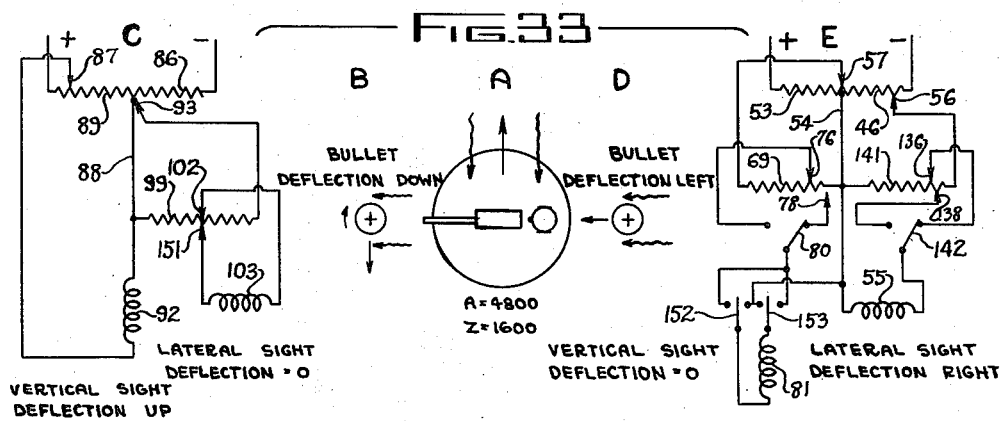
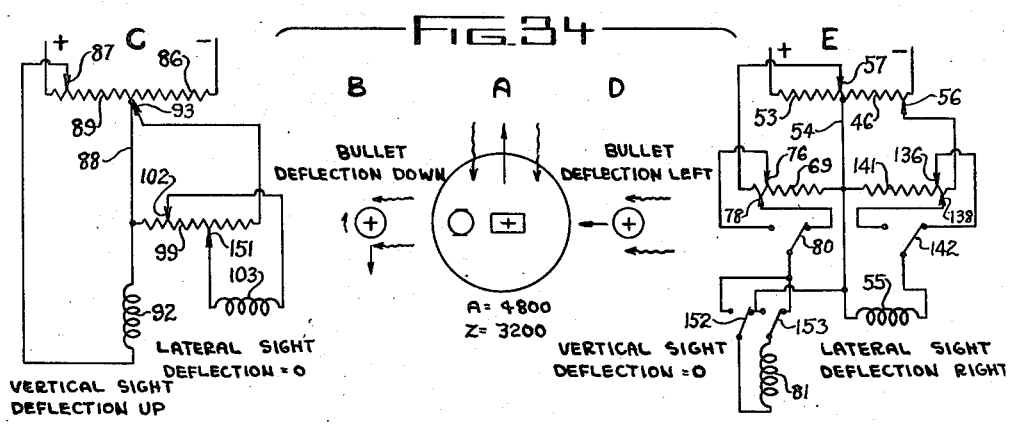

United States Patent Office 2,693,031
Patented Nov. 2, 1954

2,693,031

COMPUTING SIGHT

Kendall Clark, Oakwood, Ohio

Application May 9, 1945, Serial No. 592,764

8 Claims. (Cl. 33—49)

This invention relates to an electrical automatic compensating gun sight, particularly intended for guns mounted on moving vehicles and firing into moving targets.

At the present time, mechanical automatic gun compensating gun sights are being used in connection with the guns provided on aeroplanes and other applications. The provision of an automatic gun sight for the guns on an aeroplane presents the most difficult gun sight problem encountered in warfare. It not only must contend with the movements of the plane and the movement of the target in three dimensions; but it must also contend with varying air densities at different altitudes. To work all these factors into a mechanical compensating gun sight and to provide the proper corrections required for each makes the structure heavy, cumbersome and bulky. Since the compensating parts must be connected by mechanical linkages and transmissions with the sighting apparatus, it is necessary that the entire device be built as a single unit and very often a large single unit cannot readily be accommodated in the space which can be set aside for the gun.

Inherent in mechanical sights are inaccuracies caused by mechanical back-lash. These inaccuracies may be minimized by extreme accuracy in manufacture; but this makes it difficult to build such sights within a reasonably short time and it also tends to increase the amount of friction in the mechanism. Consequently it is very often necessary to use a power means to drive the mechanism, sometimes involving an electric motor. The extreme accuracy of manufacture makes the cost extremely high and also restricts the number of plants capable of making the sight with sufficient accuracy for satisfactory performance.

It is an object of my invention to provide an improved light weight, relatively inexpensive automatic compensating gun sight which has increased accuracy and which compensates for all material compenents of the motion of the projectile regardless of the movement of the target or the air relative to the gun.

It is another object of my invention to provide an automatic compensating gun sight in which the sighting apparatus can be made as a unit separate from the computing element and in which the location of the computing element is substantially unrestricted.

It is another object of my invention to provide an automatic compensating gun sight which has relatively few mechanical parts which require extreme accuracy in order to obtain accurate fully compensated sighting.

It is another object of my invention to combine the gun controls and the sight controls to make them convenient.

It is another object of my invention to provide an improved electrical means for computing and compensating for all material components of the motion of the projectile and compensating for all movements of the gun platform and the target.

It is another object of my invention to provide an improved electrical means for stabilizing the line of sight with respect to the axis of the bore of the gun.

It is another object of my invention to provide a remote positioning arrangement which will follow the master movement accurately without hunting.

It is another object of my invention to provide an improved electrical means for causing the sight to determine the proper lead of the gun and to compensate for the changes in the rate of speed in attempting to make the sight accurately follow the target.

It is still another object of my invention to provide a gun sight capable of universal application.

To attain these objects, the physical structure of the sight is either mechanically or electrically connected to move in unison with the guns. The optical aiming means of the sight is a movable illuminated circle operated as a stadia range finder in which the size of the circle may be adjusted to compensate for the varying size or span of the target. Mirrors are moved on vertical and horizontal axes in accordance with the movement of the gun and sight by a galvanometer type operating means to deflect the illuminated circle for causing the guns to lead the line of sight. Separate generators, connected to separate galvanometer coils on the two mirror axes are provided which are rotated by the azimuth and zenith movements of the guns. A capacitor circuit is provided in each generator which opposes increases and reductions in voltage and current generated to stabilize the movements of the illuminated circle in keeping the target encircled. These generators connect to separate circuts provided with separate variable resistances which reduce the amount of current in proportion to the increase in range. The azimuth generator circuit is also provided with a variable resistance for adjusting for the difference in the size of the circles traversed as the elevation or zenith position is changed.

In addition to the generator circuits and their separate galvanometer coils there are provided three groups of battery-fed circuits which also connect to separate galvanometer coils. The first battery-fed circuit compensates for gravity and operates upon a galvanometer coil on the vertical mirror axis. This gravity circuit is compensated by variable resistances and potentiometer arrangements for changes in the speed of the projectile caused by the differences in air speed and density, for the variation in time of flight due to differences in range, for the variation in time of flight due to shooting into or with the wind and also for the difference in effect of gravity upon the trajectory due to the difference in elevation or zenith position of the guns.

The second battery-fed circuit compensates for the jump or deflection of the spinning projectiles upon their emergence from the muzzles of the guns into a cross wind. This jump circuit is compensated by variable resistances and potentiometer arrangements for variations in the deflection caused by differences in air speed and density as well as to differences in the azimuth and zenith positions of the guns relative to the movement of the gun platform. This jump circuit is connected to separate galvanometer coils on both the vertical and horizontal mirror axes.

The third battery-fed circuit compensates for windage and operates upon separate galvanometer coils on both the vertical and horizontal mirror axes. This windage circuit is compensated by variable resistances, potentiometer arrangements and switches for differences in air speed and density, for differences in range as well as for differences in the azimuth and zenith positions of the guns relative to the movement through the air of the gun platform.

A taboo mechanism is synchronized with the movement of the guns so as to prevent firing of the guns when the guns are directed at objects in its vicinity.

Further objects and advantages of the present invention will be apparent from the following description, reference being had to the accompanying drawings, wherein a preferred form of the present invention is clearly shown.

In the drawings:

Fig. 3 is a plan view of the calibration unit for the sight which also controls the turret and the firing of the guns;

Fig. 4 is a view in elevation of the calibration unit;

Fig. 5 is an end view of the calibration unit;

Fig. 6 is a sectional view taken along the line 6—6 of Fig. 3;

Fig. 7 is a sectional view taken along the line 7—7 of Fig. 3;

Fig. 13 is a sectional view taken along the line 13—13 of Fig. 12;

Fig. 14 is a sectional view with the mirror 321 and its operating mechanism omitted taken along the line 14—14 of Fig. 12;

Fig. 15 is a view of the taboo mechanism at the left end of the computer box, as shown in Fig. 8;

Fig. 16 shows the gun turret mounted upon a two-engine plane;

Fig. 17 is a wiring diagram of the gun sight;

Fig. 18 is a range and lead diagram;

Fig. 19 is a wiring diagram of a portion of the azimuth generator circuit;

Fig. 20 is a diagram illustrating the movement of the gun in azimuth and zenith directions;

Fig. 21 is a diagram showing the variations in the effect of gravity with changes in azimuth position of the gun;

Fig. 22 is a diagram illustrating the effect of gravity according to variations in the zenith position of the gun;

Fig. 23 is a diagram illustrating the effect of air movement upon the projectile and the required adjustment of the jump and windage variable resistances, switches and potentiometer arrangements when the gun is pointed straight up (A—0, Z—0);

Fig. 24 is a similar diagram with the gun pointing directly forward (A—0, Z—1600);

Fig. 25 is a diagram similar to Figs. 23 and 24, but with the gun pointing directly down (A—0, Z—3200);

Fig. 26 is a diagram similar to Figs. 23 to 25 with the turret turned to the right and the gun pointed up (A—1600, Z—0);

Fig. 27 is a diagram similar to Fig. 26 with the gun pointed directly right (A—1600, Z—1600);

Fig. 28 is a diagram similar to Figs. 26 and 27 with the turret turned to the right and the gun pointed down (A—1600, Z—3200);

Fig. 29 is a diagram similar to Figs. 23 to 28 with the turret turned to the rear and the gun pointed up (A—3200, Z—0);

Fig. 30 is a diagram similar to Fig. 29 with the gun pointed directly toward the rear (A—3200, Z—1600);

Fig. 31 is a diagram similar to Figs. 29 and 30 with the turret turned toward the rear and the gun pointed down (A—3200, Z—3200);

Fig. 32 is a diagram similar to Figs. 23 to 31 with the turret turned toward the left and the gun pointed up (A—4800, Z—0);

Fig. 33 is a diagram similar to Fig. 32 with the gun pointed directly toward the left (A—4800, Z—1600); and Fig. 34 is a diagram similar to Figs. 32 and 33 with the turret turned toward the left and the gun pointed down (A—4800, Z—3200).

Figure 2:
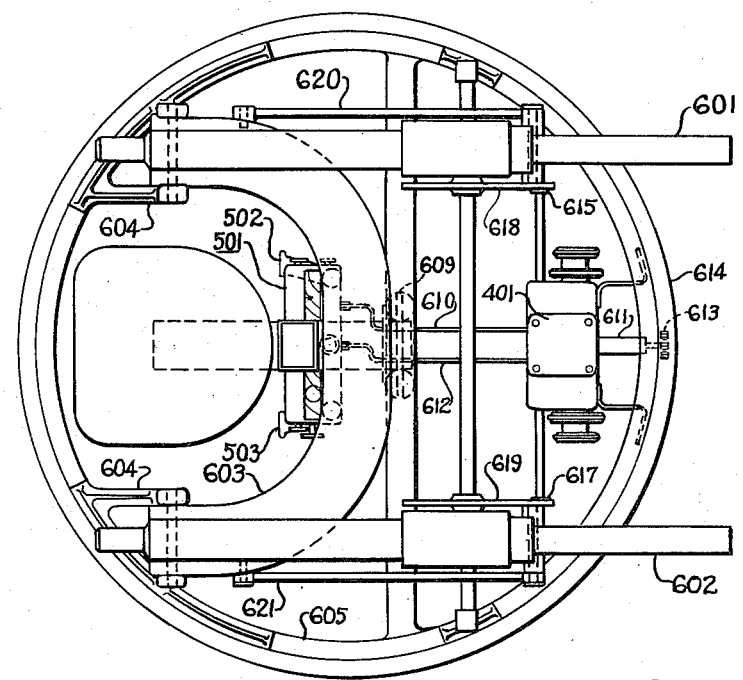
Fig. 2 is a plan view of the turret shown in Fig. 1.
Figure 1:
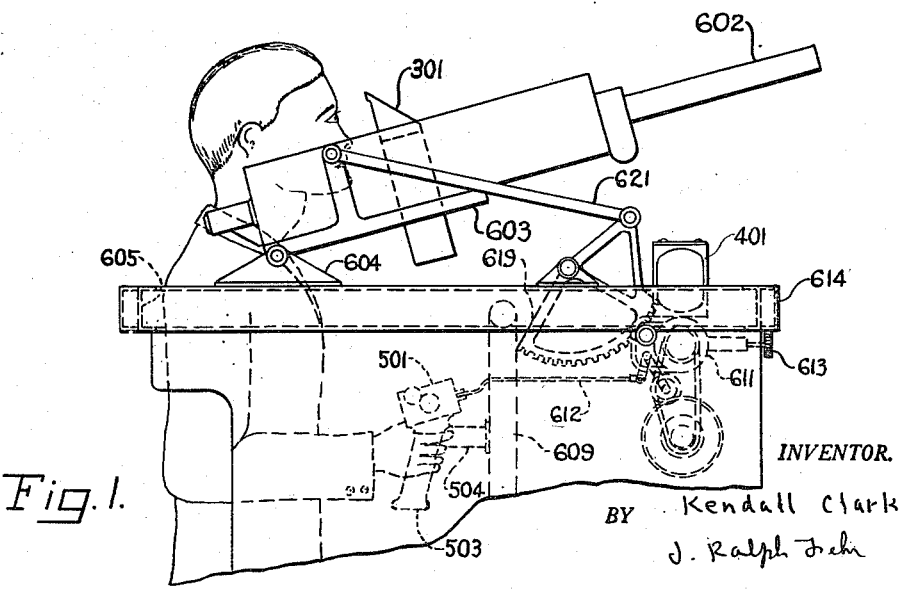
Fig. 1 is a view in elevation of a gun turret provided with my electrical automatic compensating gun sight and taboo control.

The electrical automatic compensating gun sight disclosed in the drawings is capable of being applied to substantially any type of movably mounted gun on either a stationary or moving platform to fire at either stationary or moving targets. In the embodiment shown it is shown applied to a pair of turret mounted aircraft machine guns as shown in Figs. 1 and 2 and is particularly intended to be applied to the upper turret of a two-engine bombing plane as shown in Fig. 16. However, it is also intended for anti-tank guns, anti-aircraft guns, tank mounted guns and naval guns and designed to be applicable to guns capable of being moved in any and all directions.

*The gun and turret*

Referring now more particularly to Figs. 1 and 2, there is shown two aircraft machine guns 601 and 602 mounted upon opposite sides of a pivoted yoke 603. This yoke 603 is pivotally connected to the brackets 604 which are mounted upon the turret ring 605. The rotation of the turret ring 605 and the elevation of the guns 601 and 602 is controlled by the turret control handle bars 502 and 503 which project from the main casting of the turret control member 501. The turret control member 501 is shown in detail in Figs. 3 to 7 inclusive. It is provided with a universal connection in the form of a vertical pivot pin 506 which is fixed to the casting 501 and rotatably mounted in the socket 608 which in turn is pivotally connected by the pivot pins 507 to the strut 504 which in turn is fastened to the post 609. The handle bar casting of the turret control member 501 is connected by a laterally off-center connection with a rod 610 connected to one control lever for controlling the azimuth unit of the turret drive mechanism 611 to rotate in either direction the turret ring 605. It is connected by a connection located above the axis of the pivot pin 507 to a control rod 612 which connects to a second control lever to control the zenith or elevating unit of the drive mechanism 611 for controlling the elevation of the guns 601 and 602.

The azimuth unit of the turret drive mechanism 611 rotates a pinion 613 which engages a circular rack upon the bottom of a stationary ring 614 forming a part of the structure of the airplane fuselage. The gun elevating or zenith unit of the drive mechanism 611 is provided with a set of pinions 615 and 617 for driving the sector gears 618 and 619. These sector gears are connected by links 620 and 621 with the yoke 603 for elevating the guns. As the handle bars are rotated in either direction upon the axis of the pin 506, the turret is rotated in that direction. As the handle bars 502 and 503 are pivoted upwardly or downwardly upon the axis of the pins 507, the guns 601 and 602 are raised and lowered.

*The arrangement of the sighting and compensating units*

To properly aim the guns I provide a sighting unit 301 mounted upon the yoke 603 so that it is movable with the guns 601 and 602. Preferably this sighting unit is of the reflecting collimating type providing a wide range of vision and having many other advantages which will hereinafter appear. However, my invention is not limited to this type of sighting unit. The gun sight is adjusted by a calibration unit which is incorporated in the handle bar unit 501. In addition to these units there is provided a computer box 401 which is mounted upon the top of the turret drive mechanism 611, and has an azimuth drive shaft 409 and a zenith drive shaft 411 extending downwardly and connected respectively to the azimuth and zenith drive units within the turret drive mechanism 611. By this connection the azimuth drive shaft 409 will be rotated exactly in accordance with the rotation of the turret ring 605 carrying the guns 601 and 602, while the zenith drive shaft 411 will be rotated exactly in accordance with the elevation of the guns 601 and 602.

*The lead computing system*

The azimuth drive shaft 409, through the drive gear 422, the idler gear 423, and the pinion 424 drives the azimuth electric rate generator 38 providing the power source for computing the azimuth lead factor. The azimuth drive shaft 409 is also provided with a worm 622 for driving the azimuth worm gear 419 mounted upon the end of the hollow tubular azimuth cam shaft 421 which is thereby synchronized with the movements of the turret.

In a similar manner the zenith drive shaft 411 rotates the drive gear 416 which, through the idler gear 418 drives the pinion 417 on the shaft of the zenith electric rate generator 37 providing the power source for computing the zenith lead factor. The zenith drive shaft 411 also carries a worm 412 meshing with and rotating the worm gear 413 mounted upon the zenith cam shaft 414 which is thereby synchronized with the elevating or zenith movements of the guns. The zenith cam shaft 414 is provided with an extension 469 which extends through the interior of the hollow tubular azimuth cam shaft 421 and protrudes from the opposite end thereof.

The azimuth and zenith electric rate generators are used at low current saturations below the saturation point of the magnetic circuits so that the armature voltage is substantially in direct proportion to the speed of the generator. The field windings 623 and 624 of the zenith generator 37 and the azimuth generator 38 respectively are separately excited from the 24 volt storage battery 39 through the supply conductors 625 and 626 under the control of a manual switch 627. As long as the range and speed of the projectile is constant these generators will supply the proper voltage and current to provide the desired lead.

Referring now more particularly to the diagram Fig. 18, the point O indicates the location of the sighting device and the gun; the point A indicates a distant target moved at right angles to the gun; the point B indicates a second target at exactly half the range of the target A and likewise moving at right angles to the gun at the speed as at A. The speed of the target A is indicated by the line AC while the speed of the target B is indicated by the line BD. The line sight at the instant of firing is indicated by the line AO. The movement of the target A between the firing of the gun and the arrival of the projectile at the path of the target is indicated by the line AE, while the line BF indicates the movement of the target B between the firing of the gun and the crossing of the path of the target B by the projectile. From this diagram it will be seen that although the target A travels twice as far as the target B before the projectile crosses their respective paths, but since the time of flight of the projectile is substantially twice as long for reaching the path of the target A as for the target B, the angle of lead required in each case is represented by the angle EOA.

A complication, however, results from the fact that when the sighting device follows the target A it will move in a given length of time through the angle COA while when it follows the target B it will move through the angle DOB in the same length of time. The angle DOB is substantially twice the angle COA and therefore in sighting the target B the azimuth rate generator 38 would supply substantially twice the amount of current and voltage than when following the target A. This would tend to cause the gun to lead the target B by the angle BOG while the target A would be led by the angle AOE. Such an arrangement therefore would give substantially twice as much lead as is necessary for the target B.

Diagrammatically Fig. 19 shows the method used to change the generated current and voltage the correct amount as the range is changed. As shown in the diagram Fig. 19, the output of the generator is connected to a variable potentiometer. As the range is changed from A to B in Fig. 18 the tap of the potentiometer is moved from A to B to reduce by one-half the current and voltage supplied to the actuating coil at the bottom of Fig. 19.

*The range potentiometers*

Therefore, as shown in Figs. 19 and 17, I connect the output of the azimuth generator 38 to a variable potentiometer 117 (see Figs. 8 and 11) provided with a movable tap 118 which is moved from a position at the right end of the potentiometer 117 at the maximum range corresponding to the target A to a mid-position for half the maximum range corresponding to the target B so that the current produced will be directly in proportion to the amount of lead required. A similar correction is required of the zenith generator 37 which is connected to the variable potentiometer 113 likewise provided with a movable tap 115 which is moved to the right end of the potentiometer 113 for maximum range and substantially to the mid-point for half the maximum range. At other ranges the taps 115 and 118 are moved to a position which corresponds to the range. The taps 115 and 118 project from a nut 452 of electrical insulating material. This nut 452 also carries the taps 105 and 45 contacting the variable potentiometers 104 and 44 which are incorporated in other circuits hereinafter described.

Figure 8:
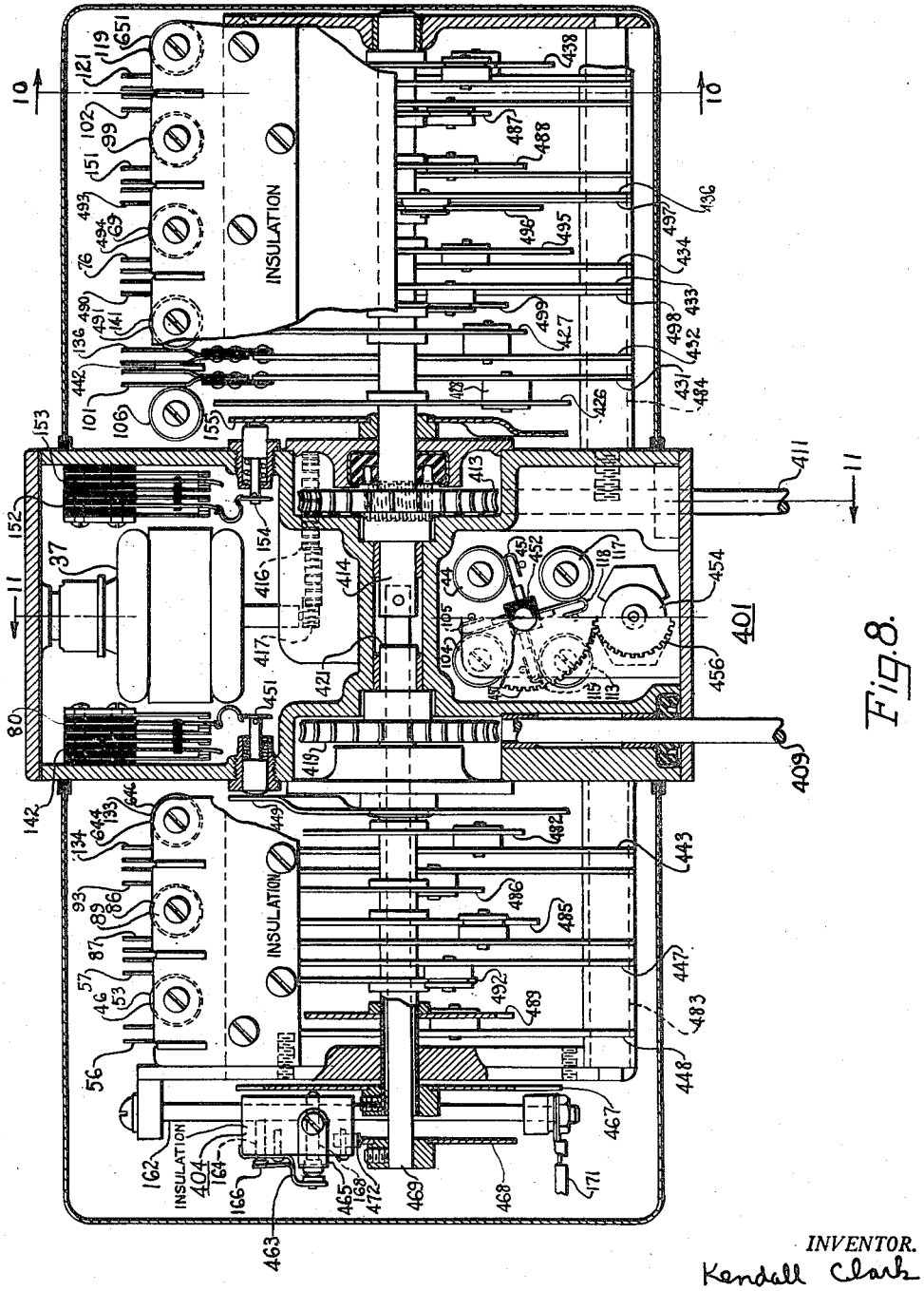
Fig. 8 is a vertical sectional view of the computer box taken substantially along the line 8—8 of Fig. 9.
Figure 11:
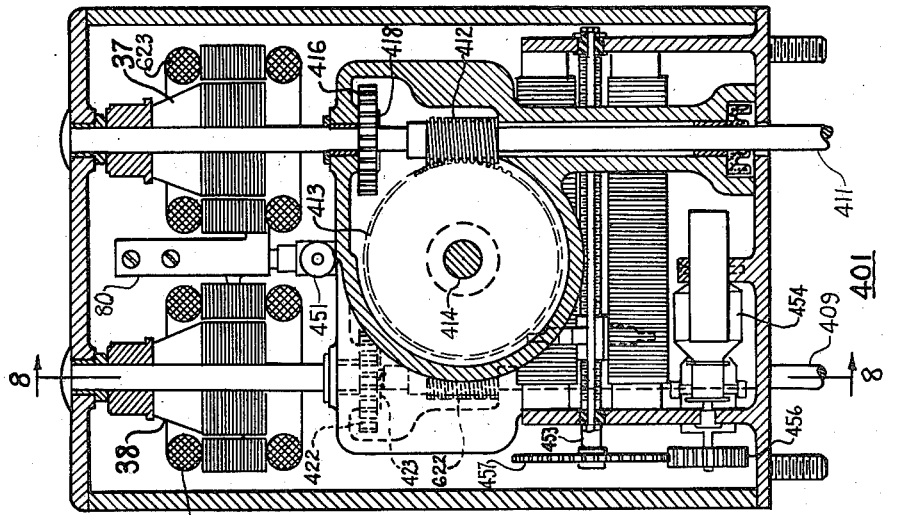
Fig. 11 is a sectional view taken along the line 11—11 of Fig. 8.

In the actual structure, as shown in Fig. 8, the taps 115, 118, 45 and 105 are in the form of bent-over springs which are spring-fitted between their respective resistances and the adjacent conductor bars in such a fashion that this spring effect of the taps cause them to spring outwardly against the bars and the potentiometer elements. These taps and the nut 452 are moved simultaneously by reason of the fact that as shown in Fig. 11 the nut 452, which carries the taps 115, 118, 45 and 105, is mounted upon the threaded shaft 453.

This threaded shaft 453 is provided with a gear 457 at one end thereof which is rotated by a large pinion 456 on the shaft of the reversible motor 454.

*The range finding system*

Figure 12:
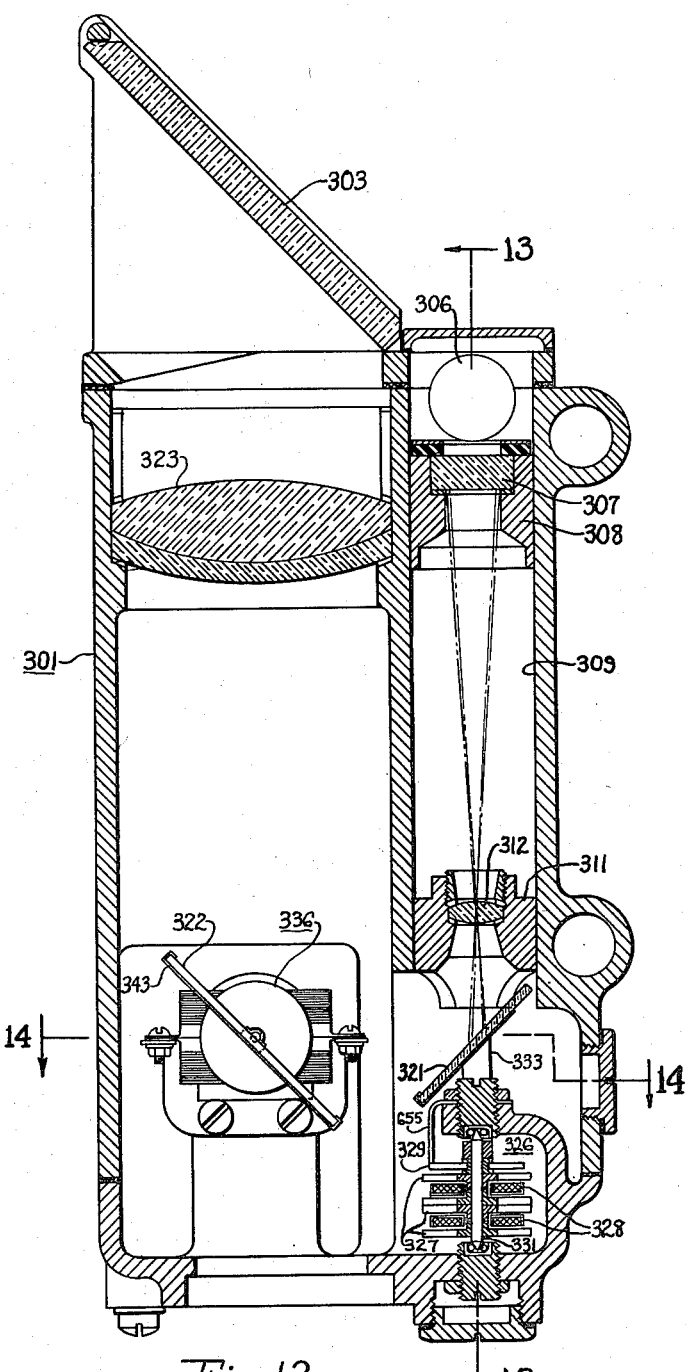
Fig. 12 is a vertical sectional view of the sighting unit taken along the line 12—12 of Fig. 13.

The reversible motor 454 is controlled primarily through an adjustable stadia type range finder which is incorporated in the sighting unit 301 (see Figs. 12 to 14). The sighting unit 301 includes a light bulb 306 which illuminates a circle reticule 307. The light bulb 306 and the circle reticule 307 are supported by a sliding member 308 which slides up and down in the bore 309 of the case casting. Also sliding in the bore 309 is a second sliding member 311 which carries the reticule lens 312. The positions of the circular reticule 307 and the reticule lens 312 are controlled by the lead screw 314. This lead screw has two separate cam grooves 318 and 319. The cam groove 318 receives the feathered cam follower 316 carried by the reticule sliding member 308, while the cam groove 319 receives the feathered cam follower 317 of the reticule lens sliding member 311. The cam grooves 318 and 319 are so cut that a real image of the illuminated circular reticule 307 is always produced upon the surface of the mirror 321. The rotation of the lead screw 314 through the cam grooves 318 and 319 moves the circular reticule 307 and the reticule lens 312 toward and away from each other so that the size of the real image projected upon the mirror 321 is contracted and expanded.

The lead screw 314 is rotated through considerable reduction gearing by a second 12 volt reversible electric motor 628 located in a chamber at the bottom of Fig. 13. This second reversible motor 628 (see Fig. 17) is controlled by the split variable resistance having the sections 629 connected by the conductor 630 to the battery supply conductor 625 and the section 631 connected by the conductor 632 to the battery supply conductor 626. These variable resistance sections 629 and 631 are incorporated in the handle bar control and calibration unit 501 (see Fig. 4). This unit 501 is provided with a thumb control 511 which moves a tap 633 (see Fig. 17) connected by a conductor to the motor 628. The other side of the motor 628 is connected by the conductor 635 to one terminal of the reversible motor 454, forming the power element of a remote positioning Wheatstone bridge circuit arrangement. Since the motors 454 and 628 are 12 volt motors, this terminal is connected by the resistances 636 and 637 to the conductors 630 and 632.

The other terminal of the motor 454 is connected to the movable armature and contact member 738 of the polarized relay 538. This movable armature and contact member 738 operates between the stationary contacts 638 and 639 which are connected to the conductors 630 and 632 respectively. The energizing coil 739 of the polarized relay 538 is connected by the conductor 640 to the tap 45 for the variable resistance 44 while the other terminal is connected to a tap 641. This tap 641 is operated by the target span dial 531 provided on top of the handle bar control and calibration unit 501 to contact the variable resistance 532 at various points in accordance with the span of the target being under observation. This target span dial must be set by recognizing the exact identification of the target and by turning the target span dial 531 to its known maximum dimension. One terminal of the variable resistance 532 is connected to the conductor 630 while the other terminal is connected by a conductor to the terminal screw 642 in the sighting unit 301 (see Fig. 13).

*The sighting unit*

This screw 642 connects to an ordinary tension coil spring 643, serving as a conductor connecting to the contact spring 310 which serves as a tap for a variable resistance 320. This contact spring 310 is carried by the reticule lens sliding member 311. Within the tubular insulator on which the stadia variable resistance 320 is wound, there is provided a tension coil spring 644 (see Fig. 13) which connects one of the terminals of the reticule illuminating bulb 306 with another terminal screw 645. The other terminal of the bulb 306 is grounded through the reticule sliding member 308 to the housing of the sighting unit 301. The real image, which, as mentioned before is projected onto the surface of the mirror 321, is reflected from the mirror 321 to the second mirror 322 and from the second mirror 322 to the compound collimating lens 323 which collimates real image and projects the collimated real image onto the transparent reflector glass 303. The collimated real image will be reflected from the reflector glass 303.

The polarized relay

The energizing coil 739 of the polarized relay 538 together with the connection to the tap 641 (see Fig. 17) and the conductor 640 connecting to the tap 45 forms the bridge of a Wheatstone bridge circuit. The master potentiometers of this circuit are the variable resistances 532 and 320 which are connected in series from the positive conductor 630 to the negative conductor 632 to form one of the parallel circuit portions or branches of a Wheatstone bridge circuit. The other parallel circuit portion or branches of the Wheatstone bridge circuit is the slave potentiometer 44 which extends from the positive supply conductor 625 to the negative supply conductor 626.

By this arrangement, when the tap 45 divides the resistance of the slave potentiometer 44 in the same ratio as the tap 641 divides the total resistance of the target resistances 532 and the stadia resistance 320, no current will flow through the energizing coil 739 of the polarized relay 538. If either the target tap 641 or the stadia tap 310 is moved to change the ratio, current will flow through the energizing coil 739 of the polarized relay 538 to electrically magnetize the movable armature and contact member 738 to cause it to be attracted by one of the permanent magnets 741, depending upon the direction of current flow, to cause it to contact the corresponding contact of the stationary contacts 638 or 639 to operate the reversible motor 454 in such a direction to move the tap 45 to the position to divide the resistance 44 in the same ratio as the target resistance 532 and the stadia resistance 320 are divided by the tap 641. Since the taps 45, 115, 105 and 118 all (see Figs. 8 and 11) are carried by the nut 452 threaded on the screw 453 rotated through gearing by the reversible motor 454, all will be adjusted in accordance with the range by this Wheatstone bridge arrangement.

Since the movable armature and contact member 738 of the polarized relay 538 tends to vibrate in performing its function, a large capacitor 740 shunts the contact 638 and the movable armature and contact member 738 while a similar large capacitor shunts the contact 639 and the movable armature and contact member 738 to smooth out the current flow to the motor 454 when the member 738 vibrates. To improve the accuracy of the polarized relay 538 I provide a demagnetizing coil 742 for removing the residual magnetism from the movable armature and contact member 738. This demagnetizing coil 742 along with the adjustable resistance 743 is connected in an auxiliary parallel circuit with the motor 454 so that it is energized whenever the motor 454 is energized.

Thus, whenever current flows through the energizing coil 739 to magnetize the movable armature and contact member 738 to engage one of the contacts, the demagnetizing coil is also energized to provide an opposing energization. At the beginning of each energization the energizing coil 739 is more strongly energized to provide a greater magnetizing action than the deenergizing coil 742. As the motor 454 operates to restore the balance of the Wheatstone bridge circuit, the current flow through the energizing coil 739 decreases thereby decreasing its magnetizing effect until it approaches zero and becomes less than the demagnetizing effect of the demagnetizing coil 742. The resistance 743 is so adjusted that the current through the demagnetizing coil 742 provides just sufficient demagnetization of the armature member 738 to return to the middle or neutral position when the coil 739 is deenergized. Through this arrangement, the motor 454 is stopped whenever the Wheatstone bridge circuit is accurately balanced.

The operator, after identifying the target, sets the dial 531 to the previously ascertained span of the target which moves the tap 641 to a corresponding position on the resistance 532. He then adjusts the reflected image of the circular reticle to the span of the target as viewed directly through the glass 303 by moving the thumb manipulator 511 in either direction until this is accomplished. In so doing, the manipulator 511 moves the tap 633 into contact with either of the resistances 629 or 631 to operate the motor 628 to rotate the lead screw 314 thereby moving the tap 310 to vary the resistance 320 according to the image of the target. By so doing, the polarized relay 538 controls the reversible motor 454 so that the nut 452 and taps 45, 118, 115 and 105 are moved to a position which is proportionate to the range of the target, as explained in connection with the Wheatstone bridge circuit.

The computation of the lead

The explanation in connection with the diagram Fig. 18 showing the necessity for a range adjustment in the azimuth and zenith generator circuits assumes that the time of flight of the projectile is proportional to the range. This is not exactly true, since the velocity of the projectile decreases in flight, but this discrepancy is corrected by making the windings of the variable resistances 44, 104, 113 and 117 proportional to the velocity of the projectile.

However, the time of flight of the projectile also varies when the gun platform is moving through the air in an airplane or similar high speed vehicle. This is due to the effect of the movement of air past the gun platform. Obviously the movement of air will slow up the projectile when fired in the direction of movement when the relative movement of the air and the projectile are in opposite directions while when the projectile is fired rearwardly in the direction opposite to the movement of the gun platform, the relative movement of the air and the projectile will be in the same direction so that average speed of the projectile will be increased and the time of flight will be shortened. Since the amount of lead is dependent upon the speed of the projectile, it is necessary to apply a slight correction to both the azimuth and zenith generator circuits. This correction takes the form of a variable resistance 644 provided in the azimuth generator circuit and having a movable tap 650. The zenith generator circuit is also provided with a variable resistance 646 provided with a movable tap 647. The taps 650 and 647 are connected together and operated by a single cam 482 on the azimuth cam shaft 421.

Figure 10:
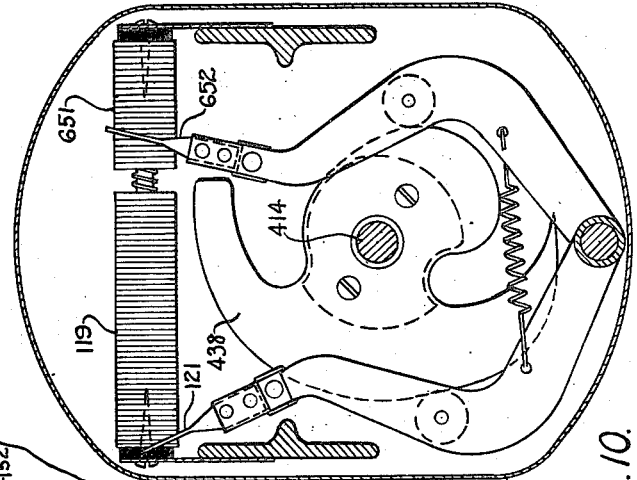
Fig. 10 is a sectional view taken along the line 10—10 of Fig. 8.
Figure 9:
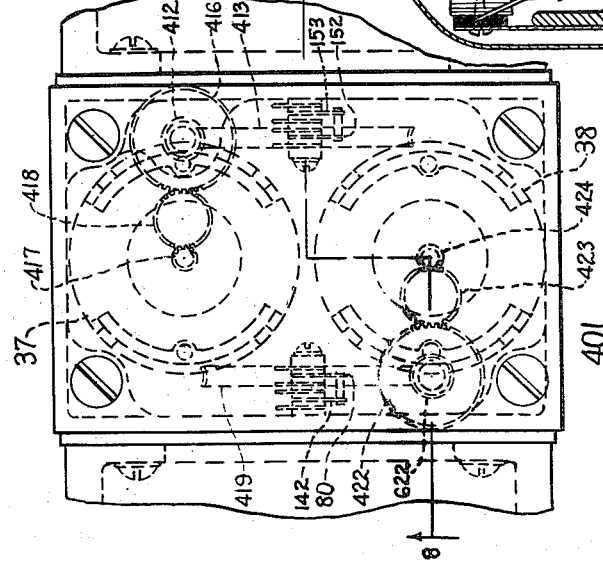
Fig. 9 is a fragmentary top view of the center portion of the computer box.

The azimuth generator circuit requires still another refinement. As will be evident from Figs. 1 and 2, the rotation of the turret causes the operation of the azimuth rate generator in exact accordance with it. When the guns are firing directly horizontally; that is, with the zenith position of 1600, the movement of the target will be relatively large in proportion to the angular rotation of the turret required to keep up with the target. However, when the target is overhead the angular rotation of the turret will be relatively large in proportion to the rate of movement of the target in the horizontal plane. This will be evident from an inspection of the diagram Fig. 20, wherein it will be seen that the circle Z—1600 is much larger than a circle at Z—400, yet the angular rotation of the turret is the same. For this reason it is necessary to add another variable potentiometer resistance 119 (see Figs. 8, 10 and 17) in the azimuth generator circuit and to provide it with a movable tap 121 operated by cam 438 on the zenith shaft 414. The cam 438 has a second cam surface operating a movable tap 652 (Fig. 10) which operates upon a second section 651 of the variable resistance 119, in movements coordinated with the tap 121 to keep the effective resistance between the taps 652 and 121 the same at all times to vary the voltage between the tap 121 and the terminal of the resistance 119 in proportion to the zenith position of the gun.

The stabilizing circuits

The provisions for providing the proper lead of the gun theoretically require that the gun follow the target exactly before firing. In practice, it is desired to fire at the target as soon as the gun is pointed at the target with the proper lead. The gunner, however, must operate his gun at a different rate than the movement of the target until he arrives at sighting line substantially direct upon the target. To do that requires that the gun be moved either at greater or lesser speed than the target which would give a greater or lesser lead than is required. The acceleration and deceleration of the gun would cause fluctuation in the amount of the lead providing a device which would be undesirable.

To stabilize the movement of the lead-providing device, I provide in the azimuth generator circuit a bucking field winding 116 in the winding of the rate generator, which is connected in series with a capacitor 114 in a circuit portion which is connected to one terminal of in series with the tap 134 the variable potentiometer resistance 106 provided on the zenith side of the computer box. This variable resistance 106 is contacted by a forked spring tap 101 carried at the upper end of a cam follower 431 which is pivoted on the horizontal shaft 484 located directly in alignment with the shaft 483. The cam follower 431 carries a roller 428 which bears against a portion of the cam surface of the cam 426 fixed to the zenith shaft 414 which, as previously described, is rotated in accordance with the zenith position of the gun.

A similar mechanical arrangement is provided for all the variable resistances and taps in the computer box 401. For this reason only the details of the mechanical construction of the tap 101 will be described. The upper ends of the cam follower are provided with a pair of thin contact fingers, the shape of which is similar to the taps 121 and 62 shown in Fig. 10. These fingers are fashioned into a spring fork, as shown in Fig. 8.

The one side of the spring fork presses against the conductor strip provided upon the adjacent face of the insulating bar 442, while the opposite side of the spring fork presses against the variable resistance 106. By this arrangement no flexible conductor is required to be connected to the movable taps. The tap 101 is connected to one end of the vertical galvanometer coil 109 (see Fig. 17) which forms a part of the fixed galvanometer field coil 336 which controls the position of the mirror 322. The other end of the coil 109 is connected to the supply conductor 625 as well as the opposite ends of the variable resistances 104 and 106.

The jump compensation

As the projectile emerges from the muzzle of the gun into an air stream flowing wholly or partially transversely to the axis of the gun, on account of its velocity of rotation, the projectile is deflected slightly at an angle. This species of deflection is called "jump." It is illustrated in Figs. 23 to 34, diagrams A, B and C. The diagram A in each case designates the position of the guns and turret. The diagram B illustrates the action of the air stream upon the projectile from the viewpoint of the gunner as the projectile emerges from the gun. The projectile is illustrated by a small circle containing a "plus" mark. The wavy arrows indicate the direction of the air stream relative to the projectile, the curved arrow at the edge of the projectile indicates the direction of rotation or spin of the projectile produced by the rifling in the gun barrel. The plus mark immediately outside the circle indicating the projectile indicates a zone of slightly higher pressure air, while the straight arrow indicates the direction of the deflection or jump. The "plus" marks surrounding the projectile indicate air movement in the same direction as the projectile while the dots indicate air movement toward the projectile. The jump causes a deflection or curve in the path of the projectile only immediately after it emerges from the muzzle of the gun. After it has completed this curve or bend insofar as the jump is concerned the projectile continues in substantially a straight line.

The jump altitude and air speed correction

In order to compensate for this jump or deflection of the projectile, there is provided the battery-fed circuit 84 connected to the supply conductors 625 and 626. This jump effect varies with the air density which, of course, varies with the altitude. For this purpose, the jump circuit 84 is provided with a means by which the resistance of the circuit is increased and the flow of current through the circuit is reduced as the altitude is increased. To provide this, the jump circuit 84 includes the variable potentiometer resistance 83 provided in the handle bar calibration unit 501 (see Figs. 3 to 7). This variable resistance 83 is provided with a tap 526 moved laterally by the screw 528. This tap 526 is provided with a pointer which cooperates with the solid line curves on the chart 517. These curves plot the jump ballistics of air speed and altitude laterally against the resistance unit 83. To set the screws 528 and 529 more accurately, the calibration unit 501 is provided with a top cover 533 of molded polymethyl methacrylite, the greater portion of which is provided with a blackened under-surface. However, the left half of this cover 533 has a cylindrical lens window 540 used to magnify the chart 517 for obtaining the most accurate positioning of the taps 526 and 527. Beneath this cover 533 is a light bulb 534. The portion of the cover 533 is molded around the light bulb 534 so that the light from this bulb will be received by the cover and transmitted through all parts thereof. This light is projected onto the charts 516 and 517 as it emerges from the right angled surfaces 536 and 537. By these facilities the variable resistances in the calibration unit 501 may be accurately set.

The jump azimuth correction

The variable resistance 83 is connected to the azimuth variable resistance 86 provided in the azimuth or left end of the computer box (see Figs. 8 and 17). The supply conductor 625 connects to one end of the variable resistance 89. The adjacent ends of the variable resistances 86 and 89 are connected together and to the conductor 88. These two resistances 86 and 89 are wrapped upon the same insulating member in the azimuth end of the computer box 401. The variable resistance 89 is provided with a tap 87 connected to one end of the vertical galvanometer coil 92 while the other end is connected to the common conductor 88. This vertical galvanometer coil 92 is provided in the fixed galvanometer field coil 338 (see Figs. 12 and 14) which operates to rotate the mirror 322 upon a horizontal axis to produce vertical deflections of the illuminating aiming circle upon the reflector glass 303.

The jump zenith correction

The resistance 86 is also connected by a tap 93 to a zenith variable resistance 99 in the zenith end of the computer box 401. The variable resistance 99 is connected by the taps 102 and 151 to the opposite ends of the lateral galvanometer coil 103 which is incorporated in the fixed galvanometer field resistance 328 which turns the mirror 321 upon a vertical axis to produce a lateral deflection of the illuminated aiming circle.

The diagram C in Figs. 23 to 34 indicates the proper position for the taps 87, 93, 102 and 151 in the various positions of the gun and turret as illustrated in the diagrams A, to compensate for the deflection illustrated in the corresponding diagrams B. The taps 87 and 93 are moved by the cams 485 and 486 which are so shaped as to move the taps to the proper position for various azimuth and zenith positions of the turret and the gun as illustrated in the diagrams A, B and C of Figs. 23 to 34. The taps 102 and 151 are moved by the cams 487 and 488 which are so shaped as to move these taps 102 and 151 to the proper position to compensate for the deflection as illustrated in diagrams A, B and C of Figs. 23 to 34. Thus through the galvanometer coils 92 and 103 the jump circuit compensates both vertically and laterally for the jump effect.

The windage compensation

The path of the projectile is also curved by the direct action of air against one side of the projectile. This deflection is called windage. It is illustrated in Figs. 23 to 34, diagrams A, D and E. The diagram D illustrates the action of the air stream upon the projectile. To compensate for this deflection called windage the battery-fed circuit 43 is provided and connected to the battery supply conductors 625 and 626.

The windage range correction

The windage deflection inherently varies with the range. For this purpose the variable potentiometer resistance 44 and a movable tap 45 positioned by the reversible motor 454 are provided for increasing the flow of current through the circuit as the range is increased.

The windage air speed and altitude correction

The windage deflection varies primarily with the air speed and also varies with the air density or altitude. In order to incorporate these factors into the windage circuit 43, the chart 516 (see Figs. 3 to 7) is provided upon a drum rotated by the knob 514 to various positions corresponding to the air speed as previously mentioned. The chart 516 has the windage ballistics of air speed and altitude plotted laterally against the windage resistance unit 42. The windage resistance unit 42 is varied by the position of the contact 518 which is moved laterally by the nut 519 when the gunner turns the knob 524 of the lead screw 521, on which the nut 519 is threaded. The nut 519 carries the magnifying the azimuth rate generator 38 and to the tap 121. Although a voltage may be generated in the winding 116, by virtue of the capacitor in the circuit no current will flow as long as the generator 38 is being operated at a constant speed. However, when the generator 38 is being accelerated or decelerated, that is when it changes its rate of speed, a current will flow through the circuit of the capacitor 114 and the field coil 116. The field coil 116 is so connected that the current produced in it during the change in rate of speed will oppose the current produced by the generator 38 to reduce or increase the amount of current ultimately delivered. By this arrangement the fluctuations in the lead provided are reduced as much as possible so that the gun may be fired substantially when it reaches the position of the target.

The zenith generator circuit is likewise provided with a field coil 112 connected in series with the capacitor 111 for providing during any change in the rate of speed of the generator 37 a current which will oppose or augment the current supplied by the generator during acceleration or deceleration thereof. This arrangement is a very great aid in making it possible to quickly deliver an accurate firing upon the target and avoid the necessity of following the target accurately for a considerable period of time before an accurate lead is provided.

The movable mirrors

The completely modified current output of the zenith generator circuit is delivered to the zenith galvanometer coil 120 which is wound as a part of the set of fixed field coils 338 (see Figs. 12 to 14) forming a part of the galvanometer assembly 336. The fixed field coils 338 (see Fig. 14) operate to rotate when energized a series of movable field magnets 337 assembled on the steel spindle 341 which is supported in ball bearings at the ends of the shaft. The spindle 341 is also connected to two spiral centering springs 339 to bring it back to the zero position when the field coils 338 are deenergized. The spindle 341 carries the mirror frame 343 which supports the mirror 322.

The azimuth rate generator circuit is connected to the galvanometer field coil 125 wound as a part of the fixed field coils 328 (see Fig. 13) of the lateral galvanometer assembly 326. The fixed field coils 328 act upon movable field magnets 327 fixed to the steel spindle 331 which is rotatably supported in the ball bearings at its opposite ends. The spindle 331 is connected to a yoke 333 which supports the mirror 321. The spindle is also connected to the inner end of a spiral centering spring 329, the outer end of which is connected to a fixed arm 655 fastened to a part of the casing of the sight 301. By this arrangement, the mirror 321 is rotated in either direction on the axis of the spindle 331 in proportion to the amount of current delivered to it by the azimuth rate generator circuit, while the mirror 322 is rotated upon the axis of the spindle 341 in accordance with the amount of current delivered to it by the zenith rate generator circuit. By thus rotating the mirrors against the tension of the centering springs, the illuminated aiming circle projected from the reflector glass 303 into the eye of the gunner will be deflected a sufficient amount to give the gun the proper lead when the target is spanned by the illuminated circuit.

The above discussion does not consider trajectory of the projectile. To compensate for the trajectory there are provided a first battery-fed circuit 132 (see Fig. 17) for compensating for the effect of gravity on the projectile, a second battery-fed circuit 84 for compensating for the jump or deviation of the projectile upon its emergence from the muzzle, and a third battery-fed circuit 43 for compensating for the effect of the air stream or windage upon the flight of the projectile.

The gravity compensation

The supply conductor 626 is connected to the variable potentiometer resistance 131 provided in the calibrating unit 501 as is shown in Fig. 6. This resistance 131 is varied by means of a tap 527 moved by a calibrating screw 529. To properly set this screw 529 and the tap 527, there is provided a rotatable chart 517 in the left side of the calibration unit 501. This rotatable chart has two sets of curves. In one set of curves the gravity ballistics of air speed and altitude are plotted laterally against the resistance unit 131 and the tap 527 is provided with a pointer for cooperating with this set of curves, which is plotted in dotted lines.

The second set of curves, plotted in full lines, has the jump ballistics of air speed and altitude plotted laterally against the jump variable resistance unit 83. The drum carrying the chart 517 is connected by a shaft 539 with a similar drum on the right side of the calibration unit which carries a chart 516. This chart 516 has the windage ballistics of air speed and altitude plotted laterally against the resistance unit 42. The chart 516 is provided with an air speed scale reading in miles per hour, so that the two drums carrying the charts 516 and 517 may be simultaneously rotated by the air speed knob 514 to set them to the proper air speed.

The gravity altitude and air speed correction

After the knob 514 is rotated to set the charts to the proper air speed, the screw 529 is turned to move the tap 527 until its pointer points to the exact altitude. It will be understood that the effect of gravity varies at different altitudes and also that the air varies in density with the altitude and as the air density grows less the resistance to the movement of the bullet grows less and its speed is increased thereby shortening the time which it takes for the projectile to reach the target and simultaneously shortening the time that gravity has an opportunity to deflect it from a straight line. Thus by this arrangement the amount of deflection of the projectile from a straight line due to gravity is decreased for higher altitudes.

The gravity range correction

As the range increases, the effect of gravity increases and for this purpose the variable potentiometer resistance 104 provided with the movable tap 105 is connected in series with the variable potentiometer resistance 131. This variable resistance 104 is one of the group of four variable resistances (see Figs. 8 and 11) located in the central portion of the computer box 401. The tap 105, like the taps of these other variable resistances, is carried by the nut 452 on the shaft 453 which is rotated by the reversible motor 454. By this arrangement the voltage on the tap 105 increases as the range is increased.

The gravity azimuth correction

The effect of gravity varies with the azimuth position of the gun and is illustrated by the diagram, Fig. 21, which includes a graph plotting gravity against azimuth position. The reason for this is that the time of flight of the projectile is increased when shooting into the air stream while it is reduced when shooting with the air stream. Since the time of flight is shorter, gravity has less time to act and deflects the projectile a lesser amount from a straight line. To take care of this there is connected in series with the tap 105 a variable resistance 133 (see Fig. 17). This variable resistance 133 (see Fig. 8) is provided on the azimuth side of the compensating unit 401 in alignment with the variable resistances 644 and 646 and has a tap 134 in contact with it. This tap is moved by a cam 482 acting upon a roller follower provided on the follower arm 443 which carries the tap 134 at its upper end. This follower arm 443 is pivotally mounted upon a shaft 483 located directly below the shaft 421. It also carries the taps 650 and 647 for the variable resistances 644 and 646. It will be recalled that the shaft 421 which carries the cam 482 is rotated in accordance with the azimuth position of the gun and its turret. By this arrangement the effect of gravity is compensated for the variation in the time of flight of the projectile in reaching the target as the gun fires into the air stream, against the air stream or across the air stream.

The gravity zenith correction

The effect of gravity also varies with the zenith position of the gun. The deflection from a straight line due to gravity, as illustrated by the diagram Fig. 22, is the greatest when the gun is directed substantially horizontal (zenith=1600). This effect grows less according to the sign of the zenith angle until the gun is either pointed upwardly or downwardly when the effect of gravity upon the deviation of the projectile from a straight line becomes zero. To compensate for the effect of the zenith position of the gun there is connected glass 520 which magnifies the portion of the chart 516 adjacent the nut 519 so that an accurate setting can be made. The magnifying glass is provided with heavy horizontal and vertical intersecting lines 522 on its underside. The knob 514 is rotated to turn the chart 516 so that the horizontal line on the magnifying glass 520 is in alignment with the proper air speed on the chart 516. The knob 524 is used to turn the screw 421 until the nut 519 and the intersection of the horizontal and vertical lines on the underside of the magnifying glass 520 is brought to the particular slant line on the chart, such as the slant line 523 corresponding to the altitude at which the plane is flying. Through this means the tap 518 on the variable resistance 42 is set to the proper value. The tap 45 is connected with the tap 518 which contacts the variable resistance 42.

The windage azimuth correction

One end of the variable potentiometer resistance 42 is connected to one end of the variable potentiometer resistance 46 (see Fig. 17). The other end of the variable resistance 46 is connected to the adjacent end of the variable resistance 53. These two variable resistances are wound upon the same insulator provided in the azimuth end of the computer box 401 (see Fig. 8). The other end of the variable resistance 53 is connected along with the other end of the variable resistance 44 to the battery supply conductor 625, as shown in Fig. 17. The common junction of the variable resistances 46 and 53 is connected by the conductor 54 to the common junction of the variable resistances 69 and 141 and to one end of the lateral galvanometer coil 55. The variable resistance 46 is provided with a movable tap 56 operated by the azimuth cam 489 through a roller provided upon the cam follower lever 448 pivotally mounted upon the fixed shaft 483 and which carries the forked tap 56 at its upper end.

The contact bar for the tap 56 is connected to a tap 490. This tap 490 operates upon a short variable resistance 491 wound on the same insulator and is in alignment with the variable resistance 141 to which it is connected. The other end of the variable resistance 141 is connected to the conductor 54 as mentioned previously. The variable resistance 53 is provided with a movable tap 57 which is provided at the upper end of a cam follower lever 447 pivoted at its lower end on the shaft 483 and provided with a roller bearing upon the cam 492 mounted upon the hollow azimuth shaft 421. The contact bar for the tap 57 is connected to the contact bar for a tap 493 which bears against a small variable resistance 494 which is wound upon the same insulator as the windage variable resistance 69 to which it is connected.

The windage zenith correction

The variable resistance 69 is provided with two sets of taps, 76 and 78. The tap 78 is located behind the tap 493 in Fig. 8. The cam 495 operates a roller upon the cam follower lever 434 to move the tap 76 provided at its upper end. The tap 493 is mounted upon the follower lever 436 which carries a cam roller bearing upon the zenith cam 496. A second roller bears upon the opposite side of this cam 496 and is carried by the follower lever 497 which is directly adjacent the lever 436 and which carries at its upper end the tap 78 which also bears against the variable resistance 69. The taps 76 and 78 are connected to the opposite terminals of the double-throw switch 80.

The variable resistance 141 is provided with the taps 136 and 138. The tap 138 is located directly behind the tap 490 in Fig. 8. The tap 136 is at the upper end of the follower lever 432 provided with a roller bearing upon the zenith cam 427 on the zenith shaft 414. The tap 138 is upon the upper end of the follower lever 498 provided with a roller bearing upon the rear side of the zenith cam 499. The front side of the cam 499 has a roller bearing upon it mounted upon the follower lever 433 which carries the tap 490. The taps 136 and 138 are connected to opposite terminals of the single-pole double-throw switch 142.

These switches 80 and 142 are provided in the central portion of the computer box 401 on the left side. These switches are in the form of movable blades separated from fixed blades on opposite sides by thin insulating blocks as shown in Fig. 8. The movable blades of the switches 80 and 142 are connected to move in unison by a pin of insulating material. The free end of the blade of the switch 80 has a C-shaped toggle spring resting against it which has its other end resting upon the cam follower 451. The cam follower 451 is held against the surface of the cam 449 by a coil spring clearly shown surrounding the follower 451 in Fig. 8. By this arrangement the switches 80 and 142 are moved by the cam 449 to connect to the taps 78 and 138 for forward shooting. For rearward shooting this cam, through the snap-acting spring, moves the switches 80 and 142 to connect with the taps 76 and 136.

The windage galvanometer coils

The common terminal of the switch 142 is connected to the other end of the lateral galvanometer coil 55 which is wound as a part of the fixed galvanometer field coil 328 for rotating the mirror 321 to produce lateral deflections of the illuminated circle upon the reflector glass 303 in the sighting unit 301. The common terminal of the switch 80 connects to one terminal of two double-throw switches 152 and 153. The adjacent terminals of these switches are connected to the common conductor 54. The terminal of the movable element of each of these switches 152 and 153 are connected to the opposite ends of the vertical deflection galvanometer coil 81 which is wound as a part of the fixed field coils 336 which rotate the mirror 322 to produce vertical deflections of the illuminating circle upon the reflector glass 303 in the sighting unit 301.

The switches 152 and 153 are constructed similar to the switches 80 and 142 and are positioned on the opposite side of the central portion of the computer box 401 as shown in Fig. 8. They are connected together by an insulating pin operated through the C-shaped snap-acting spring by a cam follower 154, which is operated by the zenith surface cam 155 which is fixed to the zenith cam shaft 414. The switches 152 and 153 taken together constitute reversing switches which reverse the connection of the galvanometer coil 81 as the zenith position of the guns goes above or below the horizontal or zenith=1600. The diagrams D and E are keyed to the corresponding diagrams A in Figs. 23 to 34. The diagrams E show the position of the various taps and switches for the position of the turret and the action of the air upon the projectile shown in diagrams A and D. The actuating cams are so shaped as to produce this movement. By making my sight cover 360 degrees of azimuth movement and movement from straight up to straight down in zenith, the sight becomes applicable to all turret locations, for example, top, bottom, side, nose and tail turrets.

The taboo mechanism

The driving mechanism for the turret allows uninterrupted movement in the azimuth direction and the movement in the zenith direction is only limited by the physical limitations of the turret. If the turret is mounted in the top of the fuselage of a two-engine bomber as shown in Fig. 16, there is a possibility that the projectiles might strike the tail or propellers or some other part of the plane. Yet it is very desirable that the movement of the guns be uninterrupted when trailing or firing at a tailing plane. Therefore in the end of the azimuth portion of the computer box 401 I have provided a taboo mechanism 404 (see Figs. 8 and 15) which will not stop the movement of the turret or the guns, but will merely prevent the firing of the guns when the guns are directed at any portion of the plane on which they are mounted. To this end I have fixed a profile cam 467 on the end of the azimuth shaft 421.

This profile taboo cam 467 is the locus of the rotational azimuth profile of the airplane with the radial zenith profile of the airplane. For example, the profile cam 467 is provided with a notch 155 which corresponds to the profile of the tail of the plane. It is provided with notches 156 and 157 which correspond to the outline of the wing tips of the plane. It is also provided with notches 158 and 159 which correspond to the outlines of the two propeller areas. In addition, it is provided with the notch 160 corresponding with the outline of the front end of the fuselage. These outlines naturally must conform to the outlines of the plane relative to the position of the guns thereon. Where the turret is positioned on a different plane or in another location on the same plane, the periphery of the cam 467 will conform to the outline of the obstacles in the line of fire.

15

The taboo mechanism also includes a spiral cam 468 fixed to the end of an extension 469 of the zenith shaft 414. Bearing on the cam 468 is the cam roller 472 which is rotatably mounted in the bottom of the slide block 471. This slide block 471 is made of insulating material and slides upon the vertical bolts 161 and 162. These bolts at their upper and lower ends are supported in insulating bushings provided in supporting brackets. The insulated slide block 471 is provided with a pair of pins 163 and 164 which bear upon the bolts 161 and 162. Pressing these pins 163 and 164 against the bolts 161 and 162 are the spring arms 165 and 166. These spring arms extend from the contact members 462 and 463. These contact members 462 and 463 are adapted to cooperate with the spring-mounted contacts 464 and 465. These spring-mounted contacts 464 and 465 are pressed into engagement with the fixed contacts 462 and 463 by the pins 167 and 168 which bear upon the surface of the profile taboo cam 467 to close the circuit to the trigger solenoids 473 and 477. These trigger solenoids are connected to the spring contacts 464 and 465 through the springs 169 and 170 which serve as conductors and also as springs for holding the roller 472 in contact with the surface of the spiral cam 468.

As shown in Fig. 15 the trigger solenoids 473 and 477, the springs 169 and 170, the contacts 464 and 465, contact members 462 and 463, and the bolts 161 and 162 are connected in parallel electric circuit portions. The bolts 161 and 162 are connected together by the conductor 171 and thence connect to a supply conductor 172. The parallel circuits are connected to the other supply conductor 173 through the dead-man's switch 509 and the trigger switch 508 which are connected in series with the parallel circuits.

The spiral cam 468 is so positioned on the zenith extension shaft 469 that when the guns are pointed directly upwardly (zenith—zero) the roller 472 rests on the lowest part of the periphery of the cam 468. When the turret is located as in Fig. 16 the cam 468 is rotated 180 degrees to present its higher portion into contact with the roller 472 at the lowest elevation of the guns. This moves the pins 167 and 168 adjacent the extreme circular periphery of the profile cam 467 so that when the guns are pointed toward one of the wings, the cam 467 will be turned so that one of the notched portions 159, for example, will be upward due to the rotation of the azimuth shaft corresponding to the position of the turret. This will cause the pins 167 and 168 to be pressed into the notch 159 thereby separating the contacts 462 and 464 and also the contacts 463 and 465. This will deenergize the trigger solenoids 473 and 477 which will prevent the firing of the guns.

This taboo mechanism does not interfere with the movement of the guns and as the turret is rotated the profile cam 467 will move the notch portion 159 away from the pins 167 and 168 to cause the cam 467 to push the contacts closed to close the solenoid circuits. It will be noted that the two guns are separately controlled so that if there is an obstruction in the path of only one of the guns the other will be permitted to fire. Accidental firing of the guns is prevented by the fact that it is necessary to close both the trigger switch and the dead-man's switch before firing is possible. For installations in other locations or upon other planes, a differently shaped profile cam 467 and spiral cam 468 are required.

While the form of embodiment of the invention as herein disclosed, constitutes a preferred form, it is to be understood that other forms might be adopted, as may come within the scope of the claims which follow.

What is claimed is as follows:

1. Sighting apparatus for a movable gun comprising in combination, a sight having an optical aiming means movable substantially in unison with movement of the gun, electrical operating means for displacing said aiming means relative to the gun, generating means for generating a current in accordance with the movement of the sight, capacitor circuit means in parallel circuit relationship with said generating means for modifying said current inversely in accordance with the change in rate of movement of said sight, and means for conducting said modified current to said electrical operating means.

2. Sighting apparatus for a movable gun comprising in combination, a sight movable substantially in unison with movement of the gun, said sight having an optical aiming means, electrical operating means having a plurality of separate impelling means for displacing said aiming

16 means relative to the gun, a generating circuit including generating means and variable resistances connected to one of the impelling means for generating a current in accordance with the movement of the sight, a power source, said generating means having field windings connected to and energized by said power source, a second circuit separate from the generating circuit provided with a plurality of variable resistances connecting said power source with the second impelling means for motivating the electrical operating means in accordance with the gravity factor of ballistic deflection, and adjustable means for varying the variable resistances in accordance with the range and position of the gun.

3. Sighting apparatus for a movable gun comprising in combination, a sight movable substantially in unison with movement of the gun, said sight having an optical aiming means, electrical operating means having a plurality of separate impelling means for displacing said aiming means relative to the gun, a generating circuit including generating means and variable resistances connected to one of the impelling means for generating a current in accordance with the movement of the sight, a power source, said generating means having field windings connected to and energized by said power source, a second circuit separate from the generating circuit provided with a plurality of variable resistances connecting said power source with the second impelling means for motivating the electrical operating means in accordance with the gravity factor of ballistic deflection, and control means for simultaneously adjusting said variable resistances according to ballistic factors.

4. Sighting apparatus for a movable gun comprising in combination, a sight movable substantially in unison with movement of the gun, said sight having an optical aiming means, electrical operating means having a plurality of separate impelling means for displacing said aiming means relative to the gun, a generating circuit including generating means and variable resistances connected to one of the impelling means for generating a current in accordance with the movement of the sight, a power source, said generating means having field windings connected to and energized by said power source, a second circuit separate from the generating circuit provided with a plurality of variable resistances connecting said power source with the second impelling means for motivating the electrical operating means in accordance with the gravity factor of ballistic deflection, a third circuit separate from the generating and second circuits provided with a plurality of variable resistances connecting said power source with the third impelling means for motivating the electrical operating means in accordance with the bullet jump factor of ballistic deflection, a fourth circuit separate from the generating and second and third circuits provided with a plurality of variable resistances connecting said power source with the fourth impelling means for motivating the electrical operating means in accordance with the windage factor of ballistic deflection, and adjustable means for varying the variable resistances in accordance with the range and position of the gun.

5. Sighting apparatus for a movable gun comprising in combination, a sight movable substantially in unison with movement of the gun, said sight having an optical aiming means, electrical operating means having a plurality of separate impelling means for displacing said aiming means relative to the gun, a generating circuit including generating means and variable resistances connected to one of the impelling means for generating a current in accordance with the movement of the sight, a power source, said generating means having field windings connected to and energized by said power source, a second circuit separate from the generating circuit provided with a plurality of variable resistances connecting said power source with the second impelling means for motivating the electrical operating means in accordance with the gravity factor of ballistic deflection, a third circuit separate from the generating and second circuits provided with a plurality of variable resistances connecting said power source with the third impelling means for motivating the electrical operating means in accordance with the bullet jump factor of ballistic deflection, a fourth circuit separate from the generating and second and third circuits provided with a plurality of variable resistances connecting said power source with the fourth impelling means for motivating the electrical operating means in accordance with the windage factor of ballistic deflection, one of said variable resistances of said fourth circuit portion forming one branch of a Wheatstone bridge circuit, said bridge circuit also including a second branch and a bridge connection having an electrical connection with each of the branches of said bridge circuit, said sight including an adjustable range finding device provided with means for varying the ratio of electrical resistance in the two portions of one of said branches located on opposite sides of one of said electrical connections in accordance with the range, and motor operated means for varying both the ratio of electrical resistance in the two portions located on opposite sides of the second of said electrical connections in said second branch and said one variable resistance in accordance with current flow in the bridge connection.

6. Sighting apparatus for a movable gun comprising in combination, a sight having an optical aiming means movable substantially in unison with movement of the gun, electrical operating means for displacing said aiming means relative to the gun, a generating means driven in accordance with the movement of the sight, said generating means including a first field winding, and a bucking field winding associated with said first field winding, capacitor means connected in series circuit relationship with said bucking field winding across the terminals of said electrical operating means.

7. An electrical computing system comprising in combination, a source of electrical power, a galvanometer having a plurality of separate coils, a generating circuit including generating means and variable resistance means connected to one of said separate coils, said generating means having field winding means connected to and energized by said power source, a second circiut separate from the generating circuit provided with a plurality of variable resistances connecting said power source with a second of said separate coils, and adjusting means for adjusting said variable resistance means.

8. Sighting apparatus for a movable gun comprising in combination, a sight movable substantially in unison with movement of the gun, said sight having an optical aiming means and an electrical operating means for displacing said aiming means relative to the gun, an electrical circuit including a source of current and a variable resistance connected to said electrical operating means for supplying a current to the electrical operating means, a Wheatstone bridge circuit including a bridge connection having an electrical connection with each of the branches of the bridge circuit, said sight including an adjustable range finding device provided with means for varying the ratio of electrical resistance in the two portions of one of said branches located on opposite sides of one of said electrical connections in accordance with the range, and motor operated means for varying both the ratio of electrical resistance in the two portions of the second of said branches located on opposite sides of the second of said electrical connections and said variable resistance in accordance with the current flow in the bridge connection.

References Cited in the file of this patent

UNITED STATES PATENTS

| Number | Name | Date |
|---|---|---|
| 1,655,276 | Lichtscheindl | Jan. 3, 1928 |
| 2,027,926 | Myers et al. | Jan. 14, 1936 |
| 2,194,141 | Estoppey | Mar. 19, 1940 |
| 2,196,269 | Morris | Apr. 9, 1940 |
| 2,247,842 | Kamenarovic | July 1, 1941 |
| 2,295,393 | Exner | Sept. 8, 1942 |
| 2,301,688 | Edwards | Nov. 10, 1942 |
| 2,363,523 | Greenblatt et al. | Nov. 28, 1944 |
| 2,393,620 | Adams et al. | Jan. 29, 1946 |
| 2,399,726 | Doyle et al. | May 7, 1946 |
| 2,414,608 | Pontius | Jan. 21, 1947 |
| 2,414,819 | Lakatos | Jan. 28, 1947 |
| 2,429,467 | Ketay | Oct. 21, 1947 |
| 2,439,381 | Darlington et al. | Apr. 13, 1948 |

FOREIGN PATENTS

| Number | Country | Date |
|---|---|---|
| 476,831 | Great Britain | Dec. 16, 1937 |